Sept. 14, 1965    J. THUY ETAL    3,206,674
METHOD OF MEASURING THE ELECTRICAL PROPERTIES OF A
SEMICONDUCTOR CRYSTAL, VIZ. THE SPECIFIC
RESISTANCE AND THE LIFE SPAN OF THE
CHARGE CARRIERS OF A
HIGH-OHMIC CRYSTAL
Filed Sept. 22, 1960
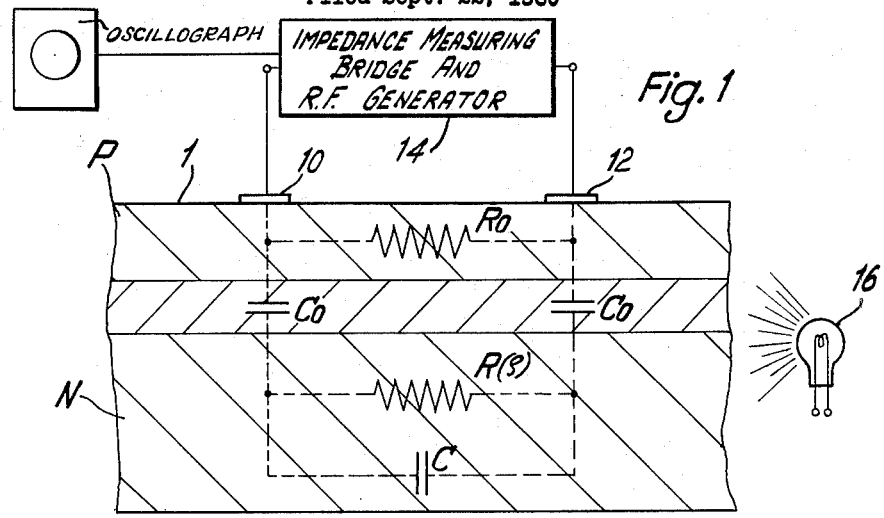
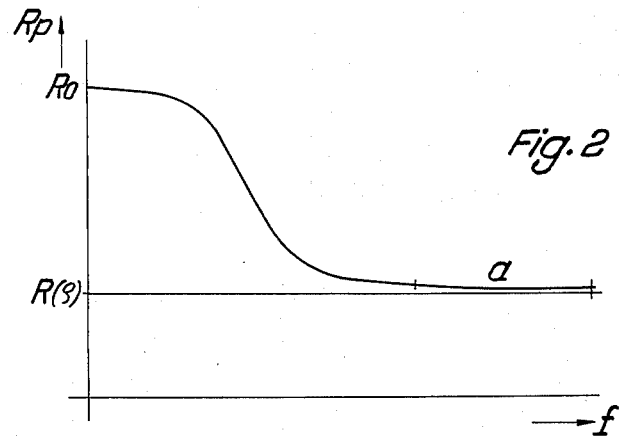
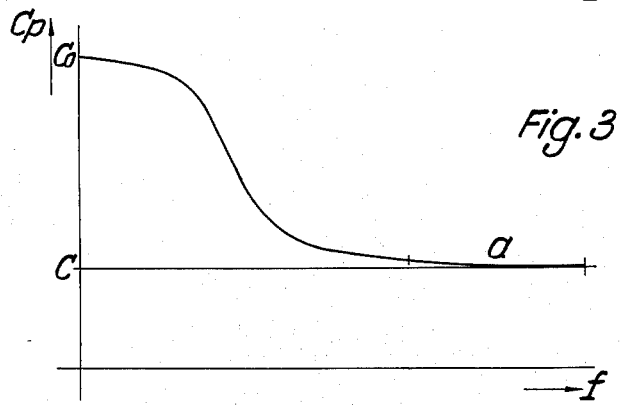
INVENTORS
Joachim Thuy &
Hermann Krauss
BY George L. Spencer
ATTORNEY

United States Patent Office 3,206,674
Patented Sept. 14, 1965

3,206,674
METHOD OF MEASURING THE ELECTRICAL PROPERTIES OF A SEMICONDUCTOR CRYSTAL, VIZ. THE SPECIFIC RESISTANCE AND THE LIFE SPAN OF THE CHARGE CARRIERS OF A HIGH-OHMIC CRYSTAL
Joachim Thuy, Ulm-Soeflingen, and Hermann Krauss, Ulm (Danube), Germany, assignors to Telefunken Aktiengesellschaft, Berlin, Germany
Filed Sept. 22, 1960, Ser. No. 57,796
Claims priority, application Germany, Sept. 24, 1959, T 17,258
6 Claims. (Cl. 324—158)

The present invention relates to a method for measuring the electrical properties of a semiconductor crystal, particularly the specific resistance and the life span of the charge carriers of a high-ohmic crystal, wherein a capacitative measurement is taken by applying flat electrodes to surfaces of the semiconductor crystal.

One method for measuring the specific resistance of semiconductor material has been used wherein a high frequency current is capacitatively coupled into the semiconductor crystal to be measured. This method provides a substantially contactless method based on the assumption that electrodes, which are alloyed onto the crystal or otherwise applied to the crystal, will, in the case of high-ohmic crystals, necessarily introduce an impurity and will, therefore, cause a reduction in the carrier life span. But the known method does not take into consideration the fact that, due to the barrier layer existing at the surface region of the semiconductor crystal, a substantial error in the measurements can arise. An exact determination is possible only if the measurement takes place throughout a wide frequency range and if a range is reached in which the measured values are no longer dependent on frequency. Under certain circumstances, this can be true only in the range near 1,000 megacycles. Thus, the measurement of properties of particular crystals, by using the known method, can give very inaccurate. Additionally, the known method has the disadvantage that crystals of known ohm-cm. values must be used in order to calibrate and make use of the measured unknown values which are obtained. That is to say, it is not possible to obtain a direct reading, i.e., an absolute determination of the specific resistance without prior calibration.

It is, therefore an object of the present invention to provide a method by which it is possible to obtain a measured value which is as close as possible to the actual value and, with this object in view, the present invention provides an arrangement in which two flat electrodes are applied to the semiconductor crystal to be measured, and in which currents of high frequency are sent through the crystal in such a way that these currents penetrate the barrier layer at the surface of the semiconductor crystal and measure the semiconductor properties in the interior of the crystal.

The frequency used depends on the particular semiconductor material and its doping. When the specific resistance $\rho$ is to be measured, the frequency should be in a range high enough so that the ohmic and capacitative admittance measured between the electrodes remains constant with increasing frequency. The specific resistance can then be determined by the formula:

(1) $\quad \rho = C_p \infty \cdot R_p \infty / \Sigma \Sigma_0$ where $\Sigma$ is the dielectric constant of the semiconductor material and $\Sigma_0$ is the dielectric constant of a vacuum, or by a calibration curve which slots $R_p \infty$ as a function of $\rho$. The calibration curve itself is determined by measuring materials of known specific resistance; $R_p \infty$ is the measured reciprocal ohmic admittance between the electrodes at the high frequency and $C_p \infty$ is the capacitance of the capacitative admittance measured at the high frequency.

It is another object of the method according to the present invention to make possible the determination of the life span of the charge carriers in the interior of the crystal, as distinguished from various known methods which determine carrier life spans of only the surface material. Inasmuch as bridge circuits are generally used for measuring the resistance between the electrodes, all that is necessary, according to the present invention, is that the previously established bridge equilibrium be disturbed, which can be done for example by a flash of light acting on the semiconductor crystal, and that the time required by the crystal to re-establish the bridge equilibrium be determined. This can be done, for example, by taking observations on an oscillograph.

Inasmuch as the complex admittance measured between the electrodes does not allow a direct determination of the specific resistance of the semiconductor material, it is additionally necessary to known the relationship between the measured values and the final values to be determined. It is, for example, important to know how the measured R and C values can be utilized to obtain the specific resistance.

In order to learn more about these relationships, an equivalent circuit is used which corresponds to the impedance between the electrodes. This equivalent circuit must above all take into account the surface barrier layer, the presence of which makes it necessary to use high frequency testing currents of a frequency of, for example, 100 megacycles, because only such high frequencies can penetrate the barrier layer relatively easily and flow through the interior of the crystal.

It is known that the thickness of the surface barrier layer depends on the magnitude of the specific resistance and, therefore, on the doping of the semiconductor material. If the semiconductor material is high-ohmic or intrinsic, then the thickness of the blocking layer is larger in comparison with its thickness in low-ohmic material. It has been found that the current penetration in the vicinity of point contacts depends on how thin the blocking layer is as compared to the decay region in the immediate vicinity of the points, which decay region is due to the contact pressure of the points.

On the other hand, if the thickness of the blocking layer is greater due to the high-ohmic characteristic of the semiconductor material—with 1000 ohm-cm. silicon semiconductor material, for example, about 50 microns—then the points and, therefore, their decay regions do not extend into the interior of the crystal, so that the test currents do not penetrate into the interior of the crystal but can only run along the surface of the crystal. As a result, only the surface conductivity is measured and not the characteristic internal conductivity.

Additional objects and advantages of the present invention will become apparent upon consideration of the following description when taken in conjunction with the accompanying drawings, in which:

FIGURE 1 is a diagram showing a crystal having electrodes attached thereto and showing a schematic representation of an equivalent circuit superimposed on the crystal.

FIGURE 2 is a graphical showing of the values of measured internal resistance plotted against the measuring frequency.

FIGURE 3 is a graphical showing of the values of the capacitive impedance component measured and plotted at different frequencies.

The question of which conductivity is measured, according to the method of the present invention, between the flat electrodes applied on the surface of the crystal, can be answered, as suggested above, by selecting an appropriate equivalent circuit accounting for the barrier layer. As shown in FIGURE 1, there is an ohmic connection between the two flat electrodes 10 and 12 and the semi-conductor surface 1, which ohmic resistance corresponds to the resistance $R_o$ in the superimposed equivalent circuit. A series-circuit comprising capacitors $C_o$ and a resistance $R(\rho)$, is connected in parallel with the surface resistance $R_o$, the capacitors $C_o$ representing the surface barrier layer capacitance as determined by the capacity of the blocking layer. The resistance $R(\rho)$ is directly representative of the specific resistance of the semi-conductor material.

If it is the specific resistance which is to be determined, the measuring problem to be solved by the measuring bridge 14, which is connected to an appropriate RF generator, is to determine this resistance $R(\rho)$. However, for the sake of accuracy, the equivalent circuit of FIGURE 1 must also include a parallel capacitor C which represents the grid lattice polarization of the crystal; thus C is a function of the dielectric constant of the material. This equivalent circuit can readily be used for analysis purposes, because it shows that the parallel conductivity, which the impedance bridge 14 measures at the two electrodes 10 and 12, is given by the formula:

(2) $\qquad 1/R_p = A + B/(1+(f_o/f)^2)$ while the parallel capacitance, which the same bridge 14 measures is given by the formula:

(3) $\qquad 1/C_p = E - F/(1+(f_o/f)^2)$

It will be seen that Formulas 2 and 3 show the same frequency response characteristic, i.e., the parallel conductivity and the parallel capacitance curves have the same characteristic shapes with respect to frequency. The constants of both formulas also have relative simple significance. A is simply the surface conductivity, namely, $1/R_o$, B is simply the internal conductivity $1/R(\rho)$, E is inversely proportional to the barrier layer capacity $C_o$ of the surface barrier layer, and F is inversely proportional to the difference between the surface barrier layer capacitance and internal capacitance which is brought about by the polarization of the crystal lattice.

If $R_p$ and $C_p$ are measured as functions of frequency, then it can be determined, according to FIGURE 2, that at low frequencies $R_p$ will be very high; in measuring heads in use today, this value will be of the order of 50 kilo ohms. As frequency increases, $R_p$ decreases and approaches asymptotically a lower value which, depending on the ohm-cm. value of the semiconductor material, can be between 100 and 1000 ohms.

FIGURE 3 shows an analogous curve for $C_p$ plotted against frequency. The $C_p$ curve begins at low frequencies with a high value, which is between about 10 and 20 picofarads (1 picofarad=1 micromicrofarad) and represents the surface barrier layer capacitance. With increasing frequency, $C_p$ becomes smaller and smaller and approaches asmyptotically the lattice polarization capacitance C. In FIGURES 2 and 3 "$a$" represents the practical frequency range in which measurement may take place.

Strictly speaking, at high frequencies the $R_p$ values approach the parallel circuit value of $R_o$ and $R(\rho)$, but inasmuch as $R_o$ is normally substantially greater than $R(\rho)$, it can be assumed that at very high frequencies in the order of 200 megacycles, the limit value which is obtained is practically equal to the resistance $R(\rho)$ in the interior of the crystal and that the surface resistance $R_o$ can be deemed negligible as compared to $R(\rho)$.

The sought-after specific resistance can be determined in two ways. It is possible either to determine the relationship between the measured resistance $R(\rho)$ and the specific resistance by means of a calibration curve of a material of known specific resistance, or to calculate the specific resistance from the measured values of $R(\rho)$ and C, i.e., from the internal resistance and the lattice polarization capacitance by using the above-mentioned Formula 1, wherein $R_p\infty$ is the reciprocal parallel conductivity at high frequencies, $C_p\infty$ the lattice polarization capacity, $\Sigma$ the dielectric constant of the semiconductor material and $\Sigma_o$ the dielectric constant of vacuum. This formula can be applied because the dielectric constant of the semiconductor material is practically independent of its doping.

When life span measurements are to be made, the bridge equilibrium is disturbed for a short period, for example, by means of a light flash produced by an appropriate source, shown schematically at 16, and a record is made, for example, by means of an oscillograph (not shown), of how long it takes before the bridge equilibrium which was disrupted by the flash of light is restored. The time required for this corresponds to the life span of the charge carriers. This is explained by the fact that the light flash changes the properties of the crystal for a short period of time; electron-hole pairs are produced which, after this short period of time, namely, the life span of the charge carriers, are recombined and restore the original state of balance in the crystal. This life span measurement can be carried out at low frequencies, for example, 500 kilocycles, or also at high frequencies, for example, 100 megacycles. When low frequencies are used, for all practical purposes, the life span of the charge carriers in the surface region is measured; at high frequencies, it is the life span of the charge carriers in the interior of the crystal which is measured.

It will be understood that the above description of the present invention is susceptible to various modifications, changes and adaptations, and the same are intended to be comprehended within the meaning and range of equivalents of the appended claims.

We claim:

1. The method of measuring the electrical properties of a semiconductor crystal, including the steps of: applying spaced electrodes to the surface of the crystal; injecting a radio frequency signal at said electrodes to pass current through the crystal at a frequency at which the resistive and the reactive components of the impedance between the electrodes and representing the surface barrier components becomes negligible as compared with the components attributable to the internal resistance and the lattice polarization capacitance of the crystal, and measuring said impedance.

2. The method set forth in claim 1, wherein the specific resistance of the crystal is determined by injecting a current of frequency so high that the measured impedance between the electrodes remains substantially constant with further increases in frequency, the specific resistance being related to the measured impedance value by the formula:

$$R(\rho) = C_p\infty \cdot R_p\infty / \Sigma\Sigma_o$$

where $R(\rho)$ = the specific resistance
$C_p\infty$ = the capacitive component of said measured impedance
$R_p\infty$ = the resistive component of said measured impedance
$\Sigma$ = the dielectric constant of the crystal and $\Sigma_o$ = the dielectric constant of a vacuum.

3. The method set forth in claim 1 wherein the specific resistance of the crystal is determined by injecting a current of frequency so high that the measured impedance between the electrodes remains substantially constant with further increases in frequency, the specific resistance being related to the measured impedance value by a calibration curve showing the specific resistance plotted against measured impedances for known crystal specimens.

4. The method set forth in claim 1 wherein the impedance measurement is made by balancing a bridge and wherein the life span of the charge carriers in the crystal is determined by balancing the measuring bridge; then subjecting the crystal to a disturbance for increasing the number of electrons and holes; and measuring the time required for the electrons and holes to recombine to produce a steady-state condition as evidenced by rebalancing of the bridge.

5. The method set forth in claim 4 wherein said disturbance is constituted by a flash of light.

6. A method as defined in claim 2 wherein the frequency of the injected current is found by:
  (1) using a relatively low random frequency,
  (2) measuring the impedance between the electrodes at this random frequency,
  (3) using another frequency higher than said random frequency,
  (4) measuring the impedance between the electrodes at this other frequency, and
  (5) continuing the above steps 1–4 until the measured impedances of two successively used frequencies are substantially constant.

References Cited by the Examiner

UNITED STATES PATENTS

| | | | |
|---|---|---|---|
| 2,733,405 | 1/56 | Gerber | 324—56 |
| 2,746,015 | 5/56 | Alsberg | 324—56 X |
| 2,773,219 | 12/56 | Aron | 317—124 |
| 2,919,398 | 12/59 | Guttwein et al. | 324—56 |

OTHER REFERENCES

Switching Circuit Employing Photodiodes (Mestre), IBM Technical Disclosure Bulletin, June 1960, Vol. 3, No. 1, pages 31–32.

WALTER L. CARLSON, *Primary Examiner.*

SAMUEL BERNSTEIN, *Examiner.*